UNITED STATES PATENT OFFICE.

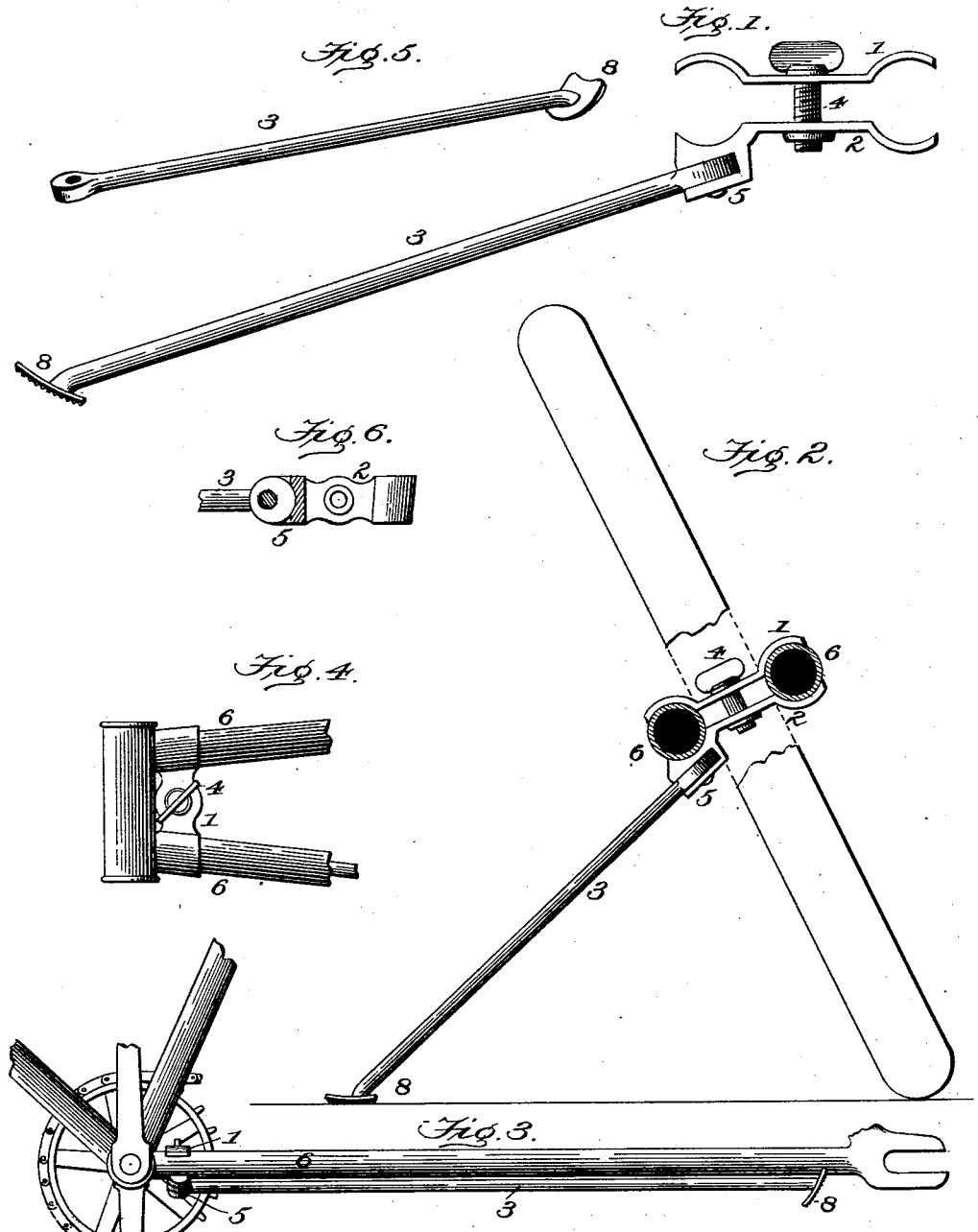

HENRY OTTO, OF BLOOMINGTON, ILLINOIS.

BICYCLE-LEG.

SPECIFICATION forming part of Letters Patent No. 571,979, dated November 24, 1896.

Application filed December 26, 1895. Serial No. 573,394. (No model.)

*To all whom it may concern:*

Be it known that I, HENRY OTTO, a citizen of the United States, residing at Bloomington, in the county of McLean and State of Illinois, have invented a new and useful Bicycle-Leg, of which the following is a specification.

My invention relates to supporting-legs for bicycles, and has for its object the provision of a device which can be adjusted to a bicycle in such a manner as will support the said bicycle in an upright position when not in use and can be conveniently carried with the machine.

With this object in view the invention consists of the details of construction and arrangement which will more fully appear hereinafter.

In the accompanying drawings, which form a part of this application, Figure 1 is a side view of the leg combination. Fig. 2 is an elevated view of the same, showing the manner in which the bicycle is supported. Fig. 3 is a longitudinal view of the leg locked to the bicycle-frame. Fig. 4 is a top view of the clamp with the leg placed under the frame. Fig. 5 is a perspective view of the leg, showing the concave-shaped foot. Fig. 6 is a view of the eccentric top end of the leg in contact with the rear wall of the jaw on the bottom plate, the top lip being removed.

Like numerals of reference indicate corresponding parts in the several views.

Referring to the drawings, I provide a leg 3, having a concave foot 8, said foot being used for securing a firm foothold and prevent the leg 3 from slipping. The eccentric top end is pivoted by a rivet or screw to the jaw 5 and the bottom plate 2, which is connected to the top plate 1. Both plates are concave or saddle shaped toward either end to fit the rear frame-rods 6 6 of a bicycle near their front ends behind the pedal-cranks. (See Figs. 3 and 4.) The top plate is allowed to spring a little toward the bottom plate 2, forced by the screw 4, thus forming a clamp to secure a firm hold of the rods 6 6.

The screw 4 may be shaped as desired, so that the clamp-plates 1 2 can be connected or be disconnected by the rider. When it is desired to support the bicycle, the leg 3 is drawn out from the bicycle at a suitable distance and the foot 8 firmly placed on the ground.

In the supporting position the eccentric-shaped top end of the leg 3 is pressed against the corresponding rear wall in the jaw 5 on the bottom plate 2, acting as a wedge to secure a firm hold. The leg 3 when not needed is swung backward and may be attached to the rods 6 6 in any suitable manner.

The foot 8 may be roughened or serrated on its bottom face in order to secure a better foothold on the ground.

The jaw 5 has a concave face, so as to conform with the eccentric-shaped top end of the leg 3.

Having thus described my invention, what I claim as new, and desire to secure by Letters Patent, is—

The combination of a top and bottom clamping-plate, connecting-screw, the inclined jaw on the bottom plate, the concave rear wall in the jaw, and a leg with a concave-ending foot the eccentric top end pivoted to the jaw, substantially as and for the purpose specified.

HENRY OTTO.

Witnesses:
H. T. KUMMER,
JOHN G. BOEKER,
HENRY DAUEL.